United States Patent
Kim et al.

(10) Patent No.: US 11,836,604 B2
(45) Date of Patent: Dec. 5, 2023

(54) METHOD FOR GENERATING PROGRAMMABLE ACTIVATION FUNCTION AND APPARATUS USING THE SAME

(71) Applicant: DEEPX CO., LTD., Seongnam-si (KR)

(72) Inventors: Lok Won Kim, Seongnam-si (KR); Ho Seung Kim, Seongnam-si (KR); Hyung Jin Chun, Suwon-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 17/750,568

(22) Filed: May 23, 2022

(65) Prior Publication Data

US 2023/0169314 A1 Jun. 1, 2023

(30) Foreign Application Priority Data

Dec. 1, 2021 (KR) .................. 10-2021-0170058
Mar. 25, 2022 (KR) .................. 10-2022-0037489

(51) Int. Cl.
*G06N 3/02* (2006.01)
*G06N 3/048* (2023.01)

(52) U.S. Cl.
CPC .................. *G06N 3/048* (2023.01)

(58) Field of Classification Search
CPC .................................................. G03N 3/0481
(Continued)

(56) References Cited

U.S. PATENT DOCUMENTS

2017/0169132 A1 6/2017 Hossack et al.
2018/0137413 A1 5/2018 Li
(Continued)

FOREIGN PATENT DOCUMENTS

JP H07-282038 A 10/1995
JP H07282038 A 10/1995
(Continued)

OTHER PUBLICATIONS

Ngah, et. al., "Sigmoid Function Implementation Using the Unequal Segmentation of Differential Lookup Table and Second Order Nonlinear Function", JTEC, vol. 9, No. 2-8, 2017 (Year: 2017).*
(Continued)

*Primary Examiner* — Tsu-Chang Lee
(74) *Attorney, Agent, or Firm* — INVENSTONE Patent, LLC

(57) ABSTRACT

A method for programming an activation function is provided. The method includes generating segment data for segmenting the activation function; segmenting the activation function into a plurality of segments using the segment data; and approximating at least one segment of the plurality of segments as a programmable segment. An apparatus for performing the method may include a programmable activation function generator configured to generate segment data for segmenting an activation function; segment the activation function into a plurality of segments using the generated segment data; and approximate at least one segment of the plurality of segments as a programmable segment. By using segment data, various non-linear activation functions, particularly newly proposed or known activation functions with some modifications, can be programmed to be processable in hardware.

16 Claims, 14 Drawing Sheets

(58) Field of Classification Search
USPC .......................................................... 706/17
See application file for complete search history.

(56) References Cited

U.S. PATENT DOCUMENTS

| | | |
|---|---|---|
| 2019/0042922 A1 | 2/2019 | Pillai et al. |
| 2019/0147323 A1* | 5/2019 | Li .................. G06N 3/0472 |
| | | 706/15 |
| 2020/0005143 A1 | 1/2020 | Zamora Esquivel et al. |
| 2020/0257981 A1 | 8/2020 | Chae et al. |
| 2021/0201153 A1 | 7/2021 | Chae et al. |
| 2021/0303977 A1 | 9/2021 | Sun et al. |
| 2021/0397928 A1* | 12/2021 | Chan .................. G06N 3/0481 |

FOREIGN PATENT DOCUMENTS

| | | |
|---|---|---|
| JP | 2016-501397 A | 1/2016 |
| JP | 2016501397 A | 1/2016 |
| KR | 10-2018-0120009 A | 11/2018 |
| KR | 10-2019-0105368 A | 9/2019 |
| KR | 10-2020-0101880 A | 8/2020 |
| KR | 10-2152615 B1 | 9/2020 |
| WO | 2014/081561 A1 | 5/2014 |

OTHER PUBLICATIONS

Non-Patent Literature "A Study on Novel Activation Function to Improve Conventional Activation".
Research on approximate fitting method of activation function based on gradient equalization in deep learning.

* cited by examiner

METHOD FOR GENERATING PROGRAMMABLE ACTIVATION FUNCTION AND APPARATUS USING THE SAME

CROSS-REFERENCE TO RELATED APPLICATIONS

This application claims the priority of Korean Patent Application No. 10-2021-0170058 filed on Dec. 1, 2021 and Korean Patent Application No. 10-2022-0037489 filed on Mar. 25, 2022, in the Korean Intellectual Property Office, the disclosure of which is incorporated herein by reference.

BACKGROUND OF THE DISCLOSURE

Technical Field

The present disclosure relates to a method for generating a programmable activation function and an apparatus using the same.

Background Art

Humans are equipped with intelligence that can perform recognition, classification, inference, prediction, and control/decision making. Artificial intelligence (AI) refers to artificially mimicking human intelligence.

The human brain is made up of numerous nerve cells called neurons, and each neuron is connected to hundreds to thousands of other neurons through connections called synapses. In order to imitate human intelligence, the modeling of the operating principle of biological neurons and the connection relationship between neurons is called an artificial neural network (ANN) model. That is, an ANN is a system that connects nodes that mimic neurons in a layer structure.

These ANN models are divided into "single-layer neural network" and "multi-layer neural network" according to the number of layers.

A general multi-layer neural network consists of an input layer, a hidden layer, and an output layer, wherein (1) the input layer is a layer that receives external data, and the number of neurons in the input layer is the same as the number of input variables, (2) the hidden layer is located between the input layer and the output layer, receives a signal from the input layer, extracts characteristics, and transmits it to the output layer, and (3) the output layer receives a signal from the hidden layer and outputs it to the outside.

When a signal is transmitted between neurons in the human brain, the signal transmission strength changes. In imitation of this, in the ANN model, the transmission strength of a signal transmitted between layers, i.e., activation is determined by an activation function.

According to the characteristics of the activation function, the inference characteristics and accuracy of the ANN model may vary. That is, the performance and efficiency of the ANN model may be determined according to the characteristics of the activation function. In addition, when an artificial neural network that processes an activation function of a complex formula is implemented with hardware, for example, a processor dedicated to the artificial neural network, a significant chip area (i.e., the number of logic gates) is required and power consumption may be significant.

In a deep neural network (DNN), which increases the number of hidden layers to implement higher artificial intelligence in multi-layer neural networks, the activation function is used to determine the transmission strength for the weighted and biased input values.

There are several types of DNNs, but convolutional neural networks (CNNs) are known to be superior to extract features from input data and identify patterns of the extracted features. CNN consists of a form in which convolution operation, activation function operation, pooling operation, and the like are processed in a specific order.

For example, in each layer of CNN, input data and a weight kernel may be a matrix composed of a plurality of channels. Convolution operation of input data and a kernel is performed, a feature map is generated by extracting features of input data (e.g., image, video, and the like) from each channel, and an activation map of the corresponding channel is generated by applying an activation function to the feature map. Thereafter, a pooling operation to the activation map may be applied.

The activation function may be configured to include an X-axis value corresponding to the input data and a Y-axis value corresponding to the output data. The activation function serves to convert the mathematical linear combination of convolution values into various types of linear or non-linear combinations. Therefore, the multi-layered artificial neural network model can be designed to perform various inference functions by applying an appropriate activation function to each layer.

Most of the complicated functions to be implemented by the artificial neural network have non-linearity, and to realize such functions, most activation functions are functions having non-linearity.

The performance and efficiency of the ANN model processed in hardware may vary depending on the non-linearity of the activation function applied to the ANN model.

The activation function may improve or degrade inference accuracy by emphasizing or deemphasizing the features of other regions of the feature map data on which the convolution has been completed.

SUMMARY OF THE DISCLOSURE

The non-linearity of at least some of the various activation functions includes a logarithmic operation, an exponential operation, and the like. Implementing an activation function including logarithmic and exponential operations in hardware is very complex in terms of digital logic design. For example, the configuration of a hardware operator becomes very complicated for logarithmic and exponential operations. Accordingly, the inventors of the present disclosure have recognized that the power consumption of hardware may increase and the operation speed may become slow.

In addition, the inventors of the present disclosure have recognized that there are disadvantages such that the hard-wired processor can only process predefined activation functions using hard-wired dedicated activation function processing logic units, respectively, and the number of logic gates rapidly increases in a hard-wired processor according to the computational complexity of the activation function.

The hard-wired processor cannot independently process the new activation function without hardware modification, and the activation function that the hard-wired processor cannot process has no choice but to be computed by separate software. For example, the hard-wired processor may be an application specific integrated circuit (ASIC) dedicated to artificial intelligence.

Conventionally, to handle various kinds of activation functions in a hard-wired processor, a method using a look-up table (LUT), a method using a nonlinear approximation equation, a method using a polynomial approximation, and the like were used.

However, the inventors of the present disclosure have recognized the problem that the conventional activation function approximation method of processing the activation function in hardware using polynomial approximation or the like requires a large amount of computation from the processor to improve accuracy.

Accordingly, the inventors of the present disclosure have recognized that improvements are required to solve the problem of deterioration of inference accuracy of the artificial neural network (ANN) model to which the conventional activation function approximation technique is applied, the problem of increasing the number of gates in the activation function processing unit of the processor, and the problem of increasing the power consumption of the processor.

Furthermore, the inventors of the present disclosure have recognized that there is a need for a programming method that can approximate any activation function in order for a processor to independently process an activation function that are not included in preset data, such as lookup tables, which cannot be processed by a processor utilized with a conventional activation function processing method, a novel activation function, or an activation function in which at least a portion thereof is modified.

Furthermore, the inventors of the present disclosure have recognized that if hardware optimized for a novel programming method is provided, it is possible to efficiently and flexibly process the programmed activation function in hardware.

Further, the inventors of the present disclosure have recognized that setting each section based on the type of activation function to be programmed, and considering the approximation error of the activation function programmed for each set section, the activation function can be programmed more efficiently and with a lower approximation error.

Accordingly, an aspect of the present disclosure is to provide an approximation method that is superior to the conventional approximation method and that can program various non-linear activation functions in hardware.

Furthermore, another aspect of the present disclosure is to provide a method of approximating the non-linear activation function in a more efficient or customized way by the user, taking into account the characteristics of the activation function, approximation error, and hardware information while approximating various non-linear activation functions.

However, the present disclosure is not limited to the above-mentioned aspects, and other aspects not mentioned will be clearly understood by those skilled in the art from the following description.

According to an example of the present disclosure, a method for programming an activation function is provided. The method may include generating a segment data for segmenting the activation function; segmenting the activation function into a plurality of segments using the segment data; and approximating at least one segment of the plurality of segments as a programmable segment.

The at least one segment of the plurality of segments may have a width different from another segment of the plurality of the segments.

Segmenting the activation function into the plurality of segments using the segment data may include determining a number and a width of the plurality of segments based on the segment data.

The segment data may include a derivative data of the activation function.

The segment data may include information on a hardware on which the activation function is to be processed.

The segment data may include a derivative data of the activation function, and segmenting the activation function into the plurality of segments using the segment data may include determining a substantially linear section or a non-linear section of the activation function based on the derivative data of the activation function.

Approximating the at least one segment of the plurality of segments to the programmable segment may include approximating the at least one segment to a specific slope and a specific offset.

The method may further include approximating the at least one segment of the plurality of segments using a predetermined non-linear approximation equation.

Approximating the at least one segment of the plurality of segments to the programmable segment may include determining a slope and an offset for approximating the at least one segment as the programmable segment; determining an error value between the at least one segment and at least one candidate segment having the determined slope and offset; and determining the programmable segment among the at least one candidate segment based on the determined error value.

Approximating the at least one segment of the plurality of segments to the programmable segment may include searching for at least one minimum error value between the programmable segment and a corresponding segment of the activation function; and determining a slope and an offset of the programmable segment based on the searched at least one minimum error value.

According to another example of the present disclosure, a method for programming an activation function is provided. The method may include selecting the activation function for artificial neural network computation; and converting the activation function into a programmable activation function. The programmable activation function may include a plurality of segments having a predetermined width; and the predetermined width may determined based on a threshold value.

The plurality of segments may include at least one segment having a width different from another segment of the plurality of the segments.

According to another example of the present disclosure, an apparatus comprising a programmable activation function generator may be provided. The apparatus may be configured to generate a segment data for segmenting an activation function, segment the activation function into a plurality of segments using the generated segment data; and approximate at least one segment of the plurality of segments as a programmable segment.

The at least one segment of the plurality of segments may have a width different from another segment of the plurality of the segments.

The programmable activation function generator may be further configured to determine a number and a width of the plurality of segments based on the segment data; and segment the activation function into the plurality of segments based on the determined number and width.

The segment data may include a derivative data of the activation function.

The segment data may include information on hardware on which the activation function is to be processed.

The segment data may include a derivative data of the activation function, and the programmable activation function generator may be further configured to determine a substantially linear section and a non-linear section of the activation function based on the derivative data of the activation function; and segment the activation function into the plurality of segments based on the determined substantially linear section and the non-linear section.

The programmable activation function generator may be further configured to determine a slope and an offset for approximating the at least one segment to the programmable segment; and approximate the at least one segment to the programmable segment based on the determined slope and offset.

The apparatus may further include a programmable activation function unit, and the programmable activation function unit may be configured to approximate the at least one segment of the plurality of segments using a predetermined non-linear approximation equation.

The detailed descriptions of other examples are included in the detailed description and drawings.

According to the present disclosure, by using segment data, various non-linear activation functions, particularly newly proposed or known activation functions with some modifications, can be programmed to be processable in hardware.

In addition, according to the present disclosure, the non-linear activation function can be programmed in a more customized way or while ensuring the high performance and high efficiency of the artificial neural network (ANN) model by approximating various non-linear activation functions, by using segment data that considers the characteristics of the activation function, approximation error, and hardware information.

In addition, according to the present disclosure, it is possible to minimize the approximation error while minimizing the hardware cost by using segment data in which the characteristics of the activation function, the approximation error, information of the hardware, and the like are considered while approximating various non-linear activation functions.

The effect according to the present disclosure is not limited by the contents exemplified above, and more various effects are included in the present disclosure.

DETAILED DESCRIPTION OF THE EMBODIMENT

Figure 1:
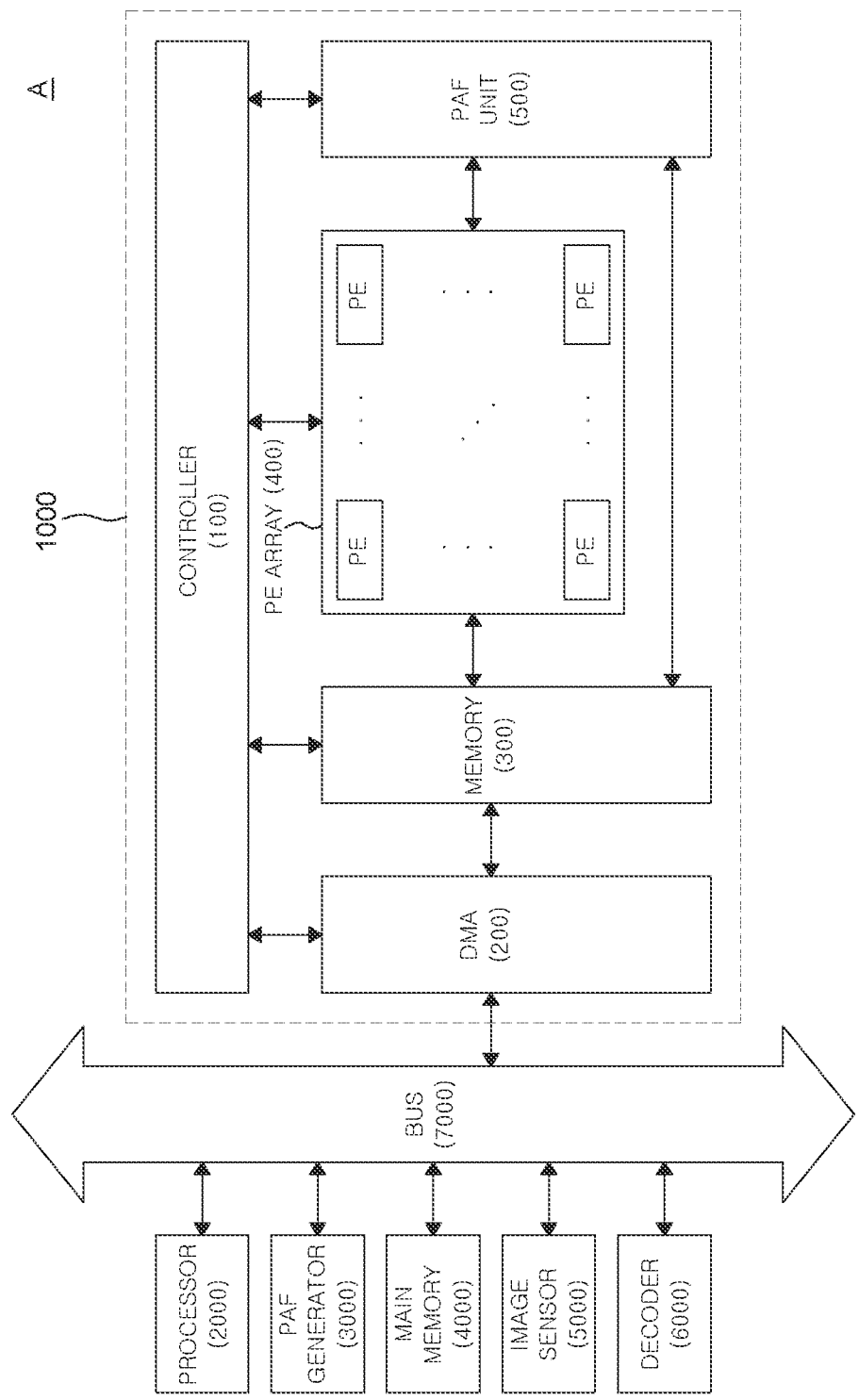
FIG. 1 is a schematic conceptual diagram illustrating an apparatus for performing activation function programming method according to an example of the present disclosure.

Particular structural or step-by-step descriptions for examples according to the concept of the present disclosure disclosed in the present specification or application are merely exemplified for the purpose of explaining the examples according to the concept of the present disclosure.

Examples according to the concept of the present disclosure may be embodied in various forms, and examples according to the concept of the present disclosure may be embodied in various forms, and should not be construed as being limited to the examples described in the present specification or application.

Since the examples according to the concept of the present disclosure may have various modifications and may have various forms, specific examples will be illustrated in the drawings and described in detail in the present specification or application. However, this is not intended to limit the examples according to the concept of the present disclosure with respect to the specific disclosure form, and should be understood to include all modifications, equivalents, and substitutes included in the spirit and scope of the present disclosure.

Terms such as first and/or second may be used to describe various elements, but the elements should not be limited by the terms.

The above terms are only for the purpose of distinguishing one element from another element, for example, without departing from the scope according to the concept of the present disclosure, and a first element may be termed a second element, and similarly, a second element may also be termed a first element.

When an element is referred to as being "connected" or in contact with" to another element, it is understood that the other element may be directly connected to or in contact with the other element, but other elements may be disposed therebetween. On the other hand, when it is mentioned that a certain element is "directly connected" or "directly connected" to another element, it should be understood that no other element is present therebetween.

Other expressions describing the relationship between elements, such as "between" and "immediately between" or "adjacent to" and "directly adjacent to", etc., should be interpreted similarly.

In this present disclosure, expressions such as "A or B", "at least one of A or/and B" or "one or more of A or/and B" may include all possible combinations thereof. For example, "A or B", "at least one of A and B" or "at least one of A or B" may refer to both (1) including at least one A, (2) including at least one B, or (3) including both at least one A and at least one B.

As used herein, expressions such as "first", "second", "first or second" may modify various elements, regardless of order and/or importance. In addition, it is used only to distinguish one element from other elements, and does not limit the elements. For example, the first user apparatus and the second user apparatus may represent different user apparatus regardless of order or importance. For example, without departing from the scope of rights described in this disclosure, the first element may be named as the second element, and similarly, the second element may also be renamed as the first element.

Terms used in present disclosure are only used to describe specific examples, and may not be intended to limit the scope of other examples.

Terms used in present disclosure are only used to describe specific examples, and may not be intended to limit the scope of other examples.

The singular expression may include the plural expression unless the context clearly dictates otherwise. Terms used herein, including technical or scientific terms, may have the same meanings as commonly understood by one of ordinary skill in the art described in this document.

Among terms used in present disclosure, terms defined in a general dictionary may be interpreted as having the same or similar meaning as the meaning in the context of the related art. Also, unless explicitly defined in this document, it should not be construed in an ideal or overly formal sense. In some cases, even terms defined in the present disclosure cannot be construed to exclude examples of the present disclosure.

The terms used herein are used only to describe specific examples, and are not intended to limit the present disclosure.

The singular expression may include the plural expression unless the context clearly dictates otherwise. It should be understood that as used herein, terms such as "comprise" or "have" are intended to designate that the stated feature, number, step, action, component, part, or combination thereof exists, but it does not preclude the possibility of addition or existence of at least one other features or numbers, steps, operations, elements, parts, or combinations thereof.

Unless defined otherwise, all terms used herein, including technical or scientific terms, have the same meaning as commonly understood by one of ordinary skill in the art to which this disclosure pertains. Terms such as those defined in a commonly used dictionary should be interpreted as having a meaning consistent with the meaning in the context of the related art, and should not be interpreted in an ideal or excessively formal meaning unless explicitly defined in the present specification.

Each of the features of the various examples of the present disclosure may be partially or wholly combined or combined with each other. In addition, as those skilled in the art can fully understand, technically various interlocking and driving are possible, and each example may be implemented independently of each other or may be implemented together in a related relationship.

In describing the examples, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Hereinafter, embodiments of the present disclosure will be described in detail with reference to the accompanying drawings.

FIG. 1 illustrates an apparatus A for performing an activation function programming method according to an example of the present disclosure.

Referring to FIG. 1, the apparatus A for performing the activation function programming method may include a neural processing unit (NPU) 1000 and a programmable activation function (PAF) generator 3000.

The apparatus A may be configured to perform various artificial neural network (ANN) inference functions and may include a processor 2000, a main memory 4000, an image sensor 5000, and a decoder 6000. Each of the elements that may be included in the apparatus A may communicate through the bus 7000 to transmit and receive data.

The NPU 1000 is a specialized processor for an operation for an ANN model, separately from a processor 2000. In particular, the NPU 1000 may be specialized for a convolution operation that occupies most of the amount of computation in the ANN model.

The NPU 1000 may further include a controller 100, a direct memory access (DMA) 200, a memory 300, a processing element (PE) array 400, and a programmable activation function (PAF) unit 500.

The controller 100 may be operatively connected to the DMA 200, the memory 300, the PE array 400, and the PAF unit 500. The controller 100 may be configured to control an operation in the NPU related to the operation of the ANN model.

However, the present disclosure is not limited thereto, and the PE array 400 according to various examples of the present disclosure may be modified and implemented with at least one processing element. The DMA 200 is configured such that the NPU 1000 directly accesses the main memory 4000 and the like outside the NPU 1000 for reading/writing. The NPU 1000 may read various data related to the ANN model from the main memory 4000 through the DMA 200.

The memory 300 may be a memory disposed in the on-chip region of the NPU 1000 and may be a memory for caching or storing data processed in the on-chip region. The memory 300 may read and store data required for calculation of the ANN model from the main memory 4000. The memory 300 may include one of memories such as ROM, SRAM, DRAM, resistive RAM, magneto-resistive RAM, phase-change RAM, ferroelectric RAM, flash memory, and high bandwidth memory (HBM). The memory 300 may be composed of at least one memory unit. The memory 300 may be configured as a homogeneous memory unit or a heterogeneous memory unit.

The PE array 400 may be configured to include a plurality of processing elements configured to calculate node data of an artificial neural network and weight data of a connection network. Each processing element may include a multiply and accumulate (MAC) operator, an arithmetic logic unit (ALU) operator, and the like.

The PAF unit 500 is configured to receive data for a programmable activation function that approximates an activation function. The data for the programmable activation function is data generated by the PAF generator 3000 in response to various activation functions. The programmable activation function data may be configured to include at least one programmed activation function. That is, the PAF unit 500 may be configured to receive at least one activation function data generated by the PAF generator 3000. In more detail, the programmed activation function may include a programmable segment, and the programmable segment may include a programmable parameter.

The NPU 1000 may receive data on the programmable activation function in relation to the activation function to perform the operation of the ANN model. The PAF unit 500 may generate an output value, i.e., an activation map, by applying the programmable activation function generated by the PAF generator 3000 to an input value calculated by the processing element of the PE array 400, i.e., a feature map. The PAF unit 500 uses the programmable activation function generated in response to the various activation functions, so that various activation functions, in particular, activation functions newly proposed or known but partially modified, can be processed by the NPU 1000.

The PAF generator 3000 may be operated by a processor 2000, but is not limited thereto. The processor 2000 may be a computing device such as a central processing unit (CPU) or an application processor (AP) capable of performing the activation function programming method of the present disclosure.

The PAF generator 3000 may be implemented by firmware or software included in hardware. A separate computing system and an operating system may be provided to operate the PAF generator 3000. The PAF generator 3000 may be a program for the operation of the NPU 1000 including the PAF unit 500. The PAF generator 3000 may be configured to perform an activation function programming method. The PAF generator 3000 may be executed by the processor 2000 or a processor external to the apparatus A. The PAF generator 3000 may be configured separately or integrated with a compiler configured to compile an artificial neural network (ANN) model for the apparatus A.

The PAF generator 3000 may select a specific activation function so as to program the selected activation function to be operable in the NPU 1000.

The PAF generator 3000 may be configured to program at least one activation function. The PAF generator 3000 may be configured to provide at least one programmed activation function data to the PAF unit 500. The programmed activation function data may include a programmable parameter corresponding to at least one programmable segment.

The PAF generator 3000 may be configured to receive activation function information included in the ANN model to be processed by the NPU 1000. The PAF generator 3000 may acquire information on all activation functions to be processed by the NPU 1000 based on the received activation function information. Accordingly, the PAF generator 3000 may program an activation function required for the artificial neural network model to be processed by the NPU 1000.

In various examples, the PAF generator 3000 may approximate at least one segment among the plurality of segments as a programmable segment by generating segment data for segmenting the activation function and segmenting the activation function into a plurality of segments using the generated segment data. The programmable segment may determine the approximation degree of the programmable segment by setting values of programmable parameters. The PAF generator 3000 may determine the number and width of the plurality of segments based on segment data. The PAF generator 3000 may be configured to analyze the characteristics of the activation function. For example, the PAF generator 3000 may be configured to analyze a change in slope of an activation function. For example, the PAF generator 3000 may determine a substantially linear section and a non-linear section of the activation function based on derivative data of the activation function. The PAF generator 3000 may approximate at least one segment with a specific slope and a specific offset value. The PAF generator 3000 may approximate at least one segment among the plurality of segments using a predetermined non-linear approximation equation. The PAF generator 3000 may determine at least one candidate segment as a programmable segment based on the determined error value by determining a slope and an offset for approximating the at least one segment to a programmable segment, and determining an error value between the at least one segment and at least one candidate segment having the determined slope and offset. The PAF generator 3000 may search for at least one minimum error value between the programmable segment and a corresponding segment of the activation function, and determine the slope and offset of the programmable segment based on the searched at least one minimum error value. That is, the PAF generator 3000 may select an activation function for artificial neural network operation and convert the activation function into a programmable activation function.

The main memory 4000 may store data required for calculation of the ANN model. The main memory 4000 may include one of memories such as ROM, SRAM, DRAM, resistive RAM, magneto-resistive RAM, phase-change RAM, ferroelectric RAM, flash memory, and high bandwidth memory (HBM). The main memory 4000 may be composed of at least one memory unit. The main memory 4000 may be configured as a homogeneous memory unit or a heterogeneous memory unit.

The image sensor 5000 may generate an image or video data of light coming through a lens, and the generated image or image data may be used as input feature map data of an ANN model.

The decoder 6000 decodes the feature map data of the encoded bit-stream, and the decoded input feature map data may be used as an input of the ANN model.

Hereinafter, an activation function programming method will be described in detail with reference to FIGS. 2, FIGS. 3A-3C, and FIGS. 4A-4D.

Figure 2:
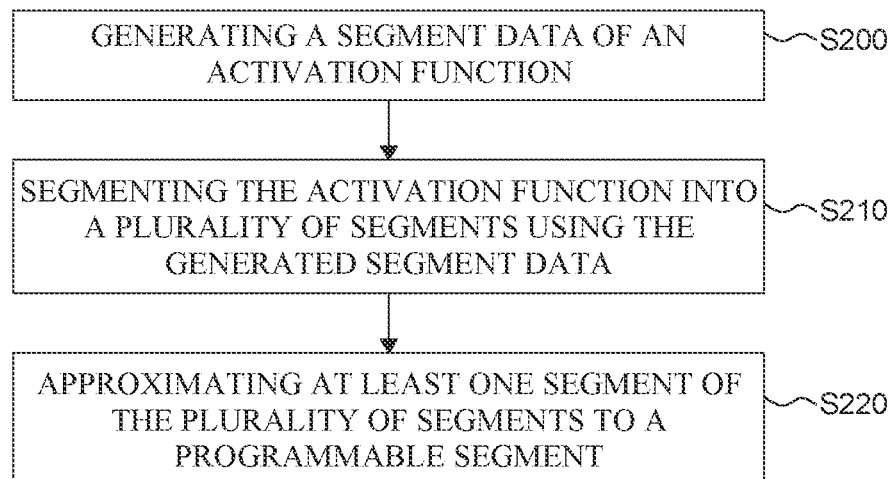
FIG. 2 is a flowchart illustrating an activation function programming method according to an example of the present disclosure.

FIG. 2 illustrates an activation function programming method according to an example of the present disclosure.

Referring to FIG. 2, the activation function programming method may include a step S200 of generating segment data for segmenting an activation function, a step S210 of segmenting the activation function into a plurality of segments using the generated segment data S210, and a step S220 of approximating at least one of the plurality of segments as a programmable segment.

In step S200, a segment data is generated. The segment data is data generated to segment the activation function into a plurality of segments. The segment data will be described later.

In step S210, the activation function is segmented into a plurality of segments using the generated segment data. In the present disclosure, the term "segment" means a portion of an activation function divided into a plurality of sections and may be distinguished from a "candidate segment" or a "programmable segment," which is a term related to approximation of an activation function.

In various examples, step S210 may include a step of determining the number and widths of a plurality of segments based on segment data. In step S210, the number of segments segmenting the selected activation function and the width of each of the plurality of segments, that is, the length of the section, may be determined using the segment data. At least one segment of the plurality of segments may have a width equal to or different from another segment.

In the present disclosure, a segment of a plurality of segments may be expressed as coordinates of start and end points along the X-axis. Meanwhile, it should be understood that when the number of the plurality of segments and width of each of the plurality of segments are determined, the coordinates of the segment of the plurality of segments may be obtained using the number and widths of the plurality of segments.

In step S220, at least one segment among the plurality of segments is approximated as a programmable segment. The programmable segment may be programmed according to the hardware configuration of the PAF unit 500. That is, the PAF generator 3000 may be configured to program an activation function to be processed in the NPU 1000 based on the hardware configuration of the PAF unit 500.

For example, the PAF unit 500 may be configured to have hardware configured to compute each segment with a specific slope and a specific offset. The PAF generator 3000 may be configured to receive configuration information of the PAF unit 500.

In this case, the PAF generator 3000 may program a segment of the corresponding activation function in the form of a linear function having a slope and an offset, a quadratic function or the like. Specifically, the programmable segment is expressed in the form of "(slope a)*(input value x)+(offset b)" to approximate the segment of the activation function. Step S220 may include approximating at least one segment among the plurality of segments with a specific slope and a specific offset value.

Figure 3A:
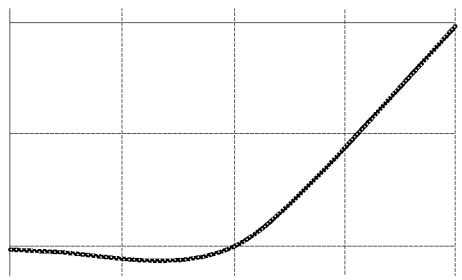
FIGS. 3A to 3C are graphs respectively illustrating a process in which an activation function is approximated by an activation function programming method according to an example of the present disclosure.
Figure 3B:
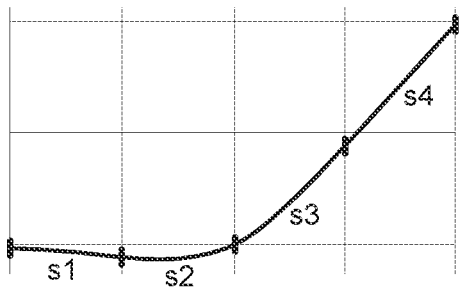
Figure 3C:
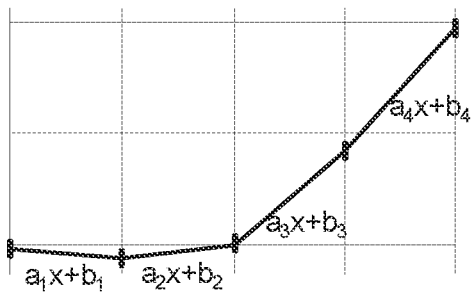

FIGS. 3A to 3C illustrate a process in which an activation function is approximated by an activation function programming method according to an example of the present disclosure.

The activation function of FIG. 3A may be segmented into a plurality of segments s1, s2, s3, and s4 using the segment data as shown in FIG. 3B. The plurality of segments s1, s2, s3, and s4 are approximated as programmable segments $a_1x+b_1$, $a_2x+b_2$, $a_3x+b_3$, and $a_4x+b_4$ as shown in FIG. 3C.

Each programmable segment may include a corresponding programmable parameter. Although all of the plurality of segments are approximated as programmable segments in FIG. 3C, in various examples, only some of the plurality of segments may be selectively approximated as a programmable segment.

For example, only segments s1, s3, and s4 are approximated as a programmable segment, and segment s2 may be approximated using various technologies provided in the apparatus in which the activation function is to be processed. Specifically, if a predetermined and stored lookup table and non-linear approximation equation are available in hardware for the segment s2, the segment s2 will be approximated using such a predetermined and stored lookup table and non-linear approximation equation.

In other words, the PAF generator 3000 may be configured to independently program each of the segments s1, s2, s3, and s4. At this time, the PAF generator 3000 can be configured to determine the approximation method for each of the segments s1, s2, s3, and s4 based on the hardware configuration information of the PAF unit 500, respectively.

For example, when the PAF unit 500 is configured to support a linear function operation, the PAF generator 3000 may program each of the segments s1, s2, s3, and s4 in the form of a linear function.

For example, when the PAF unit 500 is configured to support a first-order function and a second-order function operation, the PAF generator 3000 may program each segment s1, s2, s3 and s4 in the form of a first-order function or a second-order function.

For example, when the PAF unit 500 is configured to support a first-order function, a second-order function, and a logarithmic function operation, the PAF generator 3000 may program each segment s1, s2, s3 and s4 in the form of a first-order function, a second-order function, or a logarithmic function.

For example, when the PAF unit 500 is configured to support a first-order function, a second-order function, a logarithmic function, and an exponential function operation, the PAF generator 3000 may program each segment s1, s2, s3 and s4 in the form of a first-order function, a second-order function, a logarithmic function, or an exponential function.

For example, when the PAF unit 500 is configured to support at least one specific function operation, the PAF generator 3000 can program each of the segments s1, s2, s3, and s4 in the form of a corresponding specific function, respectively.

For example, the PAF unit 500 may be configured to include at least one of a linear function unit, a quadratic function unit, a cubic function unit, a logarithmic function unit, an exponential function unit, or a similar functional unit designed in hardware.

FIGS. 4A to 4D illustrate various cases of segmenting an activation function into a plurality of segments by an activation function programming method according to an example of the present disclosure.

Figure 4A:
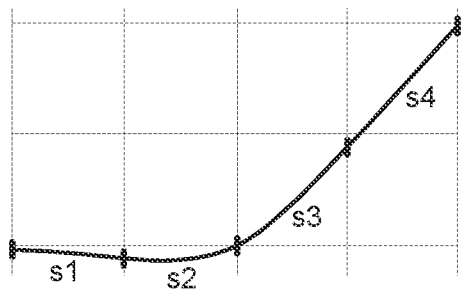
FIGS. 4A to 4D are graphs respectively illustrating various cases of segmenting an activation function into a plurality of segments by an activation function programming method according to an example of the present disclosure.

Referring to FIG. 4A, the activation function to be programmed may be segmented to have four segments and a uniform width.

Figure 4B:
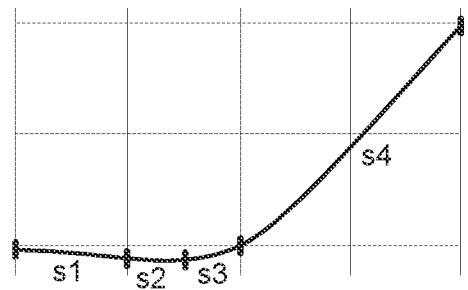
Figure 4C:
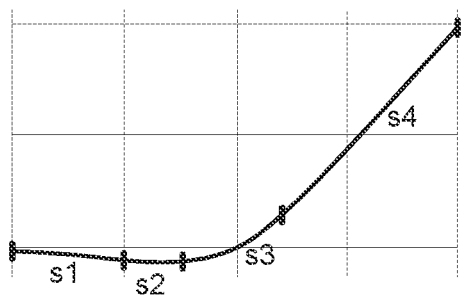

Referring to either of FIGS. 4B and 4C, the activation function to be programmed may be segmented to have four segments and different widths.

Figure 4D:
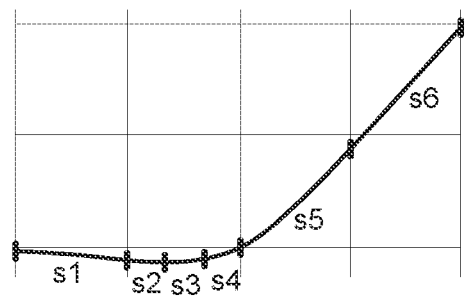

Referring to FIG. 4D, the activation function to be programmed may be segmented to have six segments and different widths.

The number of the plurality of segments and the width of each of the plurality of segments may be determined using segment data.

The PAF generator 3000 may be configured to segment a plurality of segments with different widths by analyzing the non-linearity of the activation function. However, the present disclosure is not limited thereto.

The PAF generator 3000 may be configured such that each of the plurality of segments is segmented to have an optimal width by analyzing the non-linearity of the activation function. However, the present disclosure is not limited thereto.

In the present disclosure, the activation function may be implemented in various forms including a section having a characteristic. When the activation function is segmented into a plurality of segments, the number and width of the plurality of segments may be variously determined according to various shapes of the activation function.

For example, various activation functions, such as swish function, Mish function, sigmoid function, hyperbolic tangent (tanh) function, SELU function, gaussian error linear unit (GELU) function, SOFTPLUS function, ReLU function, Leaky ReLU function, Maxout function, ELU function, and the like, may have various shapes divided into a plurality of characteristic sections including a (substantially) linear section and/or a non-linear section. Accordingly, when approximating the non-linear activation function to be processable in hardware, segmenting in consideration of these characteristic sections, that is, if the number and width of segments are determined in consideration of the (substantial) linear section and the non-linear section, the activation function can be more efficiently approximated in response to the characteristics of each activation function.

Accordingly, in the method of approximating the activation function according to the present disclosure, the concept of segment data is proposed to segment the activation function in consideration of these characteristic sections of the activation function. Segment data may include discontinuity information of the activation function, derivative data, information on hardware in which the activation function is processed, and the like, and may include processed data thereof.

Hereinafter, a detailed process of segmenting the activation function into a plurality of segments using discontinuity information among segment data will be described with reference to FIGS. 5A and 5B, FIGS. 6A and 6B, and FIGS. 7A and 7B.

Figure 5A:
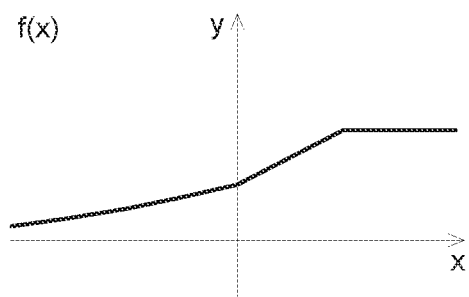
FIGS. 5A and 5B are graphs respectively illustrating an example of segmenting an activation function into a linear section or a non-linear section by using derivative data of segment data of the activation function programming method according to an example of the present disclosure.
Figure 5B:
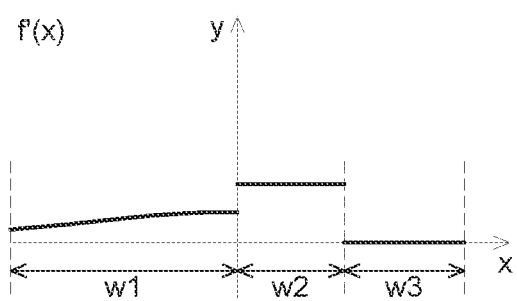

FIGS. 5A and 5B illustrate an example of segmenting an activation function into a linear section or a non-linear section by using derivative data of segment data of the activation function programming method according to an example of the present disclosure.

The discontinuous point of the activation function may mean a point at which the slope of the activation function changes. For example, the PAF generator 3000 may be configured to generate derivative data for analysis of discontinuous information of an activation function. However, the discontinuous information of the present disclosure is not limited to derivative data.

The derivative data according to examples of the present disclosure may include an nth-order derivative value of the activation function, for example, a first-order derivative value, a second-order derivative value, and a third-order derivative value. Here, the derivative data may indicate a rate of change and a discontinuity associated with the activation function.

For example, with reference to w2 of FIG. 5B, the PAF generator 3000 may segment a linear section of an activation function to be programmed into a linear function having a specific slope and a specific offset. The first-order derivative value of the linear section may be a constant value except for zero.

For example, with reference to w1 of FIG. 5B, the PAF generator 3000 may be configured to determine a section in which the first-order derivative of the activation function is a constant or non-zero section as a section having a quadratic function or greater or a curve (non-linear function).

In the present disclosure, the term "linear section" in relation to derivative data means a section in which the first-order derivative of the activation function is an integer or zero, or a section in which the activation function is expressed as a linear function. The term "non-linear interval" means an interval in which the first-order derivative of the activation function is not a constant or zero. However, the determination of the linear section of the examples of the present disclosure is not determined only by a derivative value. That is, the PAF generator 3000 may be configured to receive an activation function and determine or classify a linear section in various ways.

In other words, the derivative data described in the examples of the present disclosure is just only one mathematical calculation method for calculating the slope of the activation function. Therefore, the present disclosure is not limited to the derivative value, and it is also possible to utilize a substantially similar slope calculation method.

The second-order derivative of the activation function may represent a rate of change of the slope of the activation function.

Since the section in which the second-order derivative of the activation function is relatively large is a section in which the rate of change of the slope is dynamic, the segment of the activation function corresponding to this section has a dynamic increment or decrement due to a large change in slope. Conversely, since the section in which the second-order derivative of the activation function is relatively small is a section in which the rate of change of the slope is small, the segment of the activation function corresponding to the section has a small increment or decrement due to a small change in slope.

In particular, a section in which the second-order derivative of the activation function is very small and below a specific threshold is a section in which the rate of change of the slope is very small.

Accordingly, the PAF generator 3000 may be configured to determine the activation function of this section as a substantially linear function section in which the slope hardly changes.

For example, the PAF generator 3000 may be configured to determine a section in which the second-order derivative of the activation function is very small and below a threshold value as a "substantially linear section." A threshold value for the second-order derivative of the activation function will be described later.

A derivative order at which the derivative value of the activation function becomes zero or an integer may indicate the degree of change in the slope of the activation function. Specifically, in general, the order of the highest order term of a function is higher where the slope of the function changes rapidly. Thus, a section of the activation function where the highest order term is high is a section with a steep slope change, so that the section may be segmented to have a larger number of segments so as to be distinguished from other sections.

The order of the highest order term of the activation function in the specific section may be determined through the derivative order in which the derivative value becomes zero or an integer in the specific section.

For example, in the case of an activation function whose highest order term is third-order in a specific section, the third-order derivative value of the activation function becomes an integer (that is, the coefficient of the highest order term) in a specific section, and the fourth-order derivative value of the activation function becomes zero. Thus, in the activation function in which the third-order derivative value is an integer or the fourth-order derivative value is zero in a specific section, the order of the highest order term in the specific section may be determined as the third order.

In various examples, a section having a third or higher order of the highest order term of the activation function may be segmented to have a larger number of segments in distinction from other sections. For example, in a section in which the order of the highest order of the activation function is three or more, the number of segments may be determined as the maximum number of segmentable segments for the corresponding section in hardware in which the activation function is to be processed.

FIG. 5B shows a first-order derivative value f'(x) of the derivative data for the activation function f(x) of FIG. 5A. Referring to FIGS. 5A and 5B, f(x) is a curve (non-linear function) in the w1 section where f(x) is neither constant nor zero, f(x) is a linear function in the section w2 where f'(x) is a non-zero constant, and f(x) is a constant in the section w3 where f'(x) is zero.

Using the derivative data, that is, the first derivative f'(x), the activation function f(x) is segmented into three sections w1, w2, and w3 including two linear sections w2 and w3.

That is, the PAF generator 3000 may determine and segment the linear sections w2 and w3 and the non-linear sections w1 using the derivative data of the activation function f(x) to be programmed.

That is, the activation function f(x) may be segmented according to a point or section where the first derivative f'(x) is a constant (i.e., non-zero), zero, a curve below a threshold (i.e., non-linear function below a threshold), or a curve (i.e., non-linear function). In other words, the activation function f(x) may be segmented according to a point at which the activation function f(x) is not differentiable or a point at which the first derivative f'(x) is discontinuous.

Although the result of segmentation into three segments is shown in FIG. 5B, this is to briefly explain the process of segmentation into a linear section and a non-linear section, it should be understood that the activation function f(x) may be segmented into four or more sections, i.e., at least four segments, using the segment data.

For example, the non-linear section w1 may be further segmented into a plurality of segments using segment data according to the activation function programming method disclosed in the present disclosure. By additional segmenting of the non-linear section w1, the activation function can be segmented into a larger number of segments and approximated, so that an approximation error can be reduced. In the present disclosure, the term "approximation error" means the difference between a specific segment of an activation function and a programmable segment approximating the specific segment.

Figure 6A:
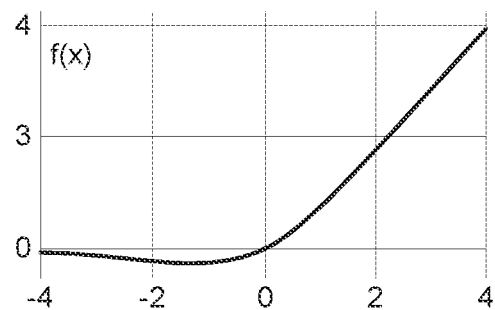
FIGS. 6A and 6B are graphs respectively illustrating an example of segmenting an activation function into a substantially linear section and/or a non-linear section by using derivative data of segment data of the activation function programming method according to an example of the present disclosure.
Figure 6B:
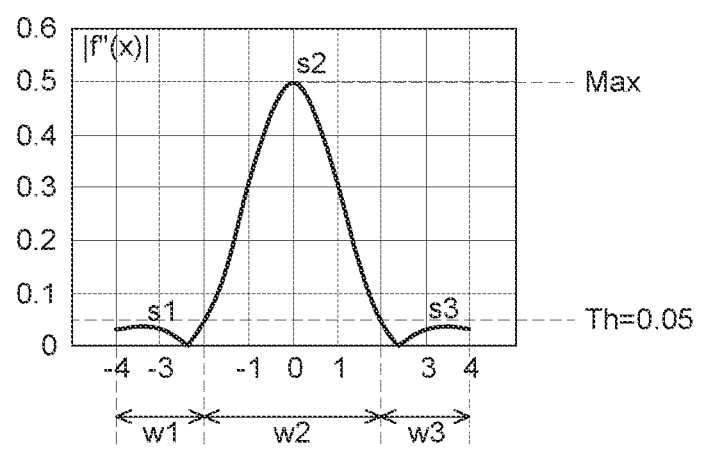

FIGS. 6A and 6B illustrate an example of segmenting an activation function into a substantially linear section and/or a non-linear section by using derivative data of segment data of the activation function programming method according to an example of the present disclosure.

FIG. 6B shows the absolute value of the second derivative f"(x) of the derivative data for the activation function f(x) of FIG. 6A. The PAF generator 3000 may be configured to determine a substantially linear section by setting a specific threshold value to the second derivative f'(x). Referring to FIG. 6B, when the maximum value Max of the absolute value of the second derivative f"(x) of the activation function f(x) is 0.5, a threshold value Th may be set as 0.05, which is 10% of the maximum value Max.

That is, the threshold value Th may be determined as a relative ratio of the absolute value of the second derivative f"(x) of the activation function f(x) to the maximum value Max. The threshold value Th may be determined for non-linear sections based on an acceptable level of approximation error of an artificial neural network model. For example, the threshold value may be determined according to the level of the error value of each segment that determines the degree of deterioration in accuracy of the artificial neural network model to which the programmed activation function is applied.

In more detail, as the threshold value increases, a width of the segment of the substantially linear section can be programmed more widely. Meanwhile, as the width of the segment increases, the number of segments may be reduced. That is, the total number and width of segments of the programmed activation function may vary according to the threshold value.

In the examples of FIG. 6B, the relative ratio is determined to be 10%, but may be determined to be 5% according to the allowable error of the artificial neural network model. Using the derivative data, that is, the second derivative f"(x), the activation function f(x) can be segmented by sections w1 and w3, in which the second derivative f"(x) is less than the threshold value Th, and the section w2, in which the second derivative f"(x) is greater than or equal to the threshold value Th. Substantially linear sections w1 and w3 and a non-linear section w2 may be determined and segmented using derivative data of the activation function f(x).

Although the result of segmentation into three sections is shown in FIG. 6B, this is to briefly explain the process of segmentation into a substantially linear section and a non-linear section, and thus, it should be understood that the activation function f(x) may be segmented into four or more segments, i.e., at least four segments, using segment data.

For example, the non-linear section w2 may be further segmented into a plurality of segments using segment data according to the activation function programming method disclosed in the present disclosure. An approximation error may be reduced by additional segmenting of the non-linear section w2.

Figure 7A:
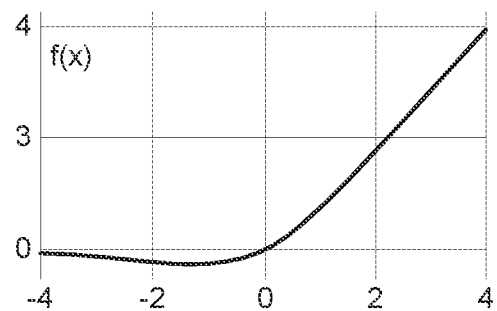
FIGS. 7A and 7B are graphs respectively illustrating another example of segmenting an activation function into a substantially linear section and a non-linear section by using derivative data of segment data of the activation function programming method according to an example of the present disclosure.
Figure 7B:
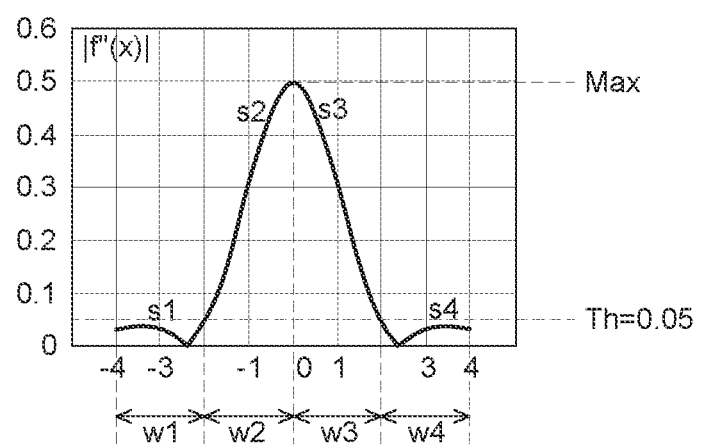

FIGS. 7A and 7B illustrate another example of segmenting an activation function into a substantially linear section and a non-linear section by using derivative data of segment data of the activation function programming method according to an example of the present disclosure.

Referring to FIGS. 7A and 7B, the non-linear section in the activation function f(x) may be determined based on the threshold value Th of the segment data, that is, the absolute value of the second derivative f"(x). That is, a section greater than or equal to the threshold value Th may be determined as a non-linear section. Specifically, referring to FIG. 7B, the PAF generator 3000 may segment the activation function f(x) into a substantially linear section and/or a non-linear section using the derivative data, that is, the second derivative value f"(x). In addition, the non-linear section of the activation function f(x) can be segmented into, for example, two segments s2 and s3.

That is, the activation function f(x) may be segmented into substantially linear sections w1 and w4 and non-linear sections w2 and w3 using derivative data.

Although the result of segmentation into four sections is shown in FIG. 7B, this is to briefly explain the process of segmentation into a substantially linear section and a nonlinear section, and thus, it should be understood that the activation function f(x) may be segmented into five or more sections, i.e., at least five segments, using segment data.

For example, the non-linear sections w2 and w3 may be further segmented into a plurality of segments using segment data according to the activation function programming method disclosed in the present disclosure. An approximation error may be reduced by additional segmenting of the non-linear sections w2 and w3.

As shown in FIGS. 5A and 5B, FIGS. 6A and 6B, and FIGS. 7A and 7B, when the activation function is segmented using derivative data, a linear section or a substantially linear section from the activation function can be distinguished from a non-linear section before approximating the activation function. A segment with a distinct linear section or substantially linear section can be approximated as a programmable segment expressed in the form of "(slope a)×(input value x)+(offset b)."

In this case, the segment having a linear section or a substantially linear section may be in the form of a linear function or a substantially linear function having a substantially constant slope. Therefore, if the activation function is compared with the programmable segment expressed in slope and offset, the programmed segment may have zero or minimal approximation error.

Accordingly, if the activation function is programmed using the derivative data, the amount of calculation for a linear section or a substantially linear section can be significantly reduced.

Therefore, the activation function programmed with a linear or substantially linear section according to the examples of the present disclosure is efficient and the approximation error is minimized, and thus, it is possible to provide an improvement in the operation speed of an artificial neural network model processed in the NPU 1000, a minimization of deterioration in inference accuracy, and a reduction in power consumption of the NPU 1000.

In various examples, the step S210 may include a step of determining a linear section of the activation function based on the derivative data of the activation function.

In various examples, the step S210 may include a step of determining a non-linear section of the activation function based on the derivative data of the activation function.

In various examples, the step S210 may include a step of determining a substantially linear section of the activation function based on the derivative data of the activation function.

In various examples, the step S210 may include a step of determining a linear section and a non-linear section of the activation function based on the derivative data of the activation function.

In various examples, the step S210 may include a step of determining a substantially linear section and a non-linear section of the activation function based on the derivative data of the activation function.

In various examples, the step S210 may include a step of determining a linear section, a substantially linear section, and a non-linear section of the activation function based on the derivative data of the activation function.

In various examples, the segment data may include information of hardware on which the activation function is processed. In the activation function programming method according to examples of the present disclosure, the activation function may be segmented using hardware information. The hardware data may include the number of comparators, the number of gates used in the implemented circuit, and the implemented circuit type (e.g., exponential circuit, logarithmic circuit, anti-logarithmic circuit, and the like) of the NPU 1000 for an ANN model.

For example, the number of segments for segmenting the activation function may be limited according to the number of comparators of the PAF unit 500 of the NPU 1000. Accordingly, the activation function may be segmented into the maximum number of segments that can be processed by the NPU 1000 for processing the activation function or the number of segments corresponding to the allocated resource of the NPU 1000. Accordingly, the PAF generator 3000 may program the activation function using the predetermined hardware resource in a more efficient or more customized manner.

In various examples, step 220 may include a step of approximating at least one of the plurality of segments as a programmable segment based on the discontinuity.

In various examples, step 220 may include a step of approximating at least one of the plurality of segments as a programmable segment based on the error value.

In the present disclosure, the term "error value" or "approximate error value" means a difference between a specific segment of an activation function and a programmable segment which is the approximated specific segment.

With respect to the error value, various activation functions may be divided into a plurality of characteristic sections including (substantially) linear sections and/or non-linear sections. If these characteristic sections are segmented into segments of the same width, the error value is greatly varied for each segment. Accordingly, in the activation function programming method according to examples of the present disclosure, in order to reduce an approximation error, it is possible to approximate programmable segments in consideration of at least one of these characteristic sections in various ways.

In particular, in the process of programming the activation function, a discontinuity may appear between programmable segments. In the activation function programming method according to examples of the present disclosure, it is possible to significantly reduce an approximation error by utilizing such a discontinuity between programmable segments or appearing at the starting point and/or ending point of one programmable segment.

Accordingly, according to the present disclosure, an error value can be significantly reduced by utilizing a discontinuity between programmable segments in the process of segmenting the activation function into a plurality of segments using segment data and approximating at least one segment of the plurality of segments to a programmable segment based on the error value.

In various examples, step S220 may include a step of calculating an error value by comparing the slope and offset of the programmable segment with the corresponding segment of the activation function.

In various examples, step S220 may include a step of determining a programmable parameter for converting at least one segment of an activation function into the programmable segment. Here, when the programmable segment is a linear function, the programmable parameter may include a slope and an offset corresponding to the linear function. Here, when the programmable segment is a quadratic function, the programmable parameter may include coefficients of the quadratic term. The coefficients of the quadratic function may include quadratic coefficients, linear coefficients, and constants.

In various examples, step S220 may include a step of calculating an error value between at least one segment of the activation function and at least one candidate segment having a (temporary) slope and (temporary) offset.

In various examples, step S220 may include a step of determining a parameter of at least one candidate segment as a programmable parameter of the programmable segment based on the calculated error value.

Accordingly, the PAF generator 3000 may provide the programmed activation function data to the NPU 1000. Here, the programmed activation function data may include at least one programmed activation function. Here, the programmed activation function data may include a programmable parameter corresponding to each programmable segment of the at least one programmed activation function.

Hereinafter, a process of approximating at least one of a plurality of segments as a programmable segment based on an error value will be described in detail with reference to FIG. 8, FIGS. 9A and 9B, and FIGS. 10A and 10B.

Figure 8:
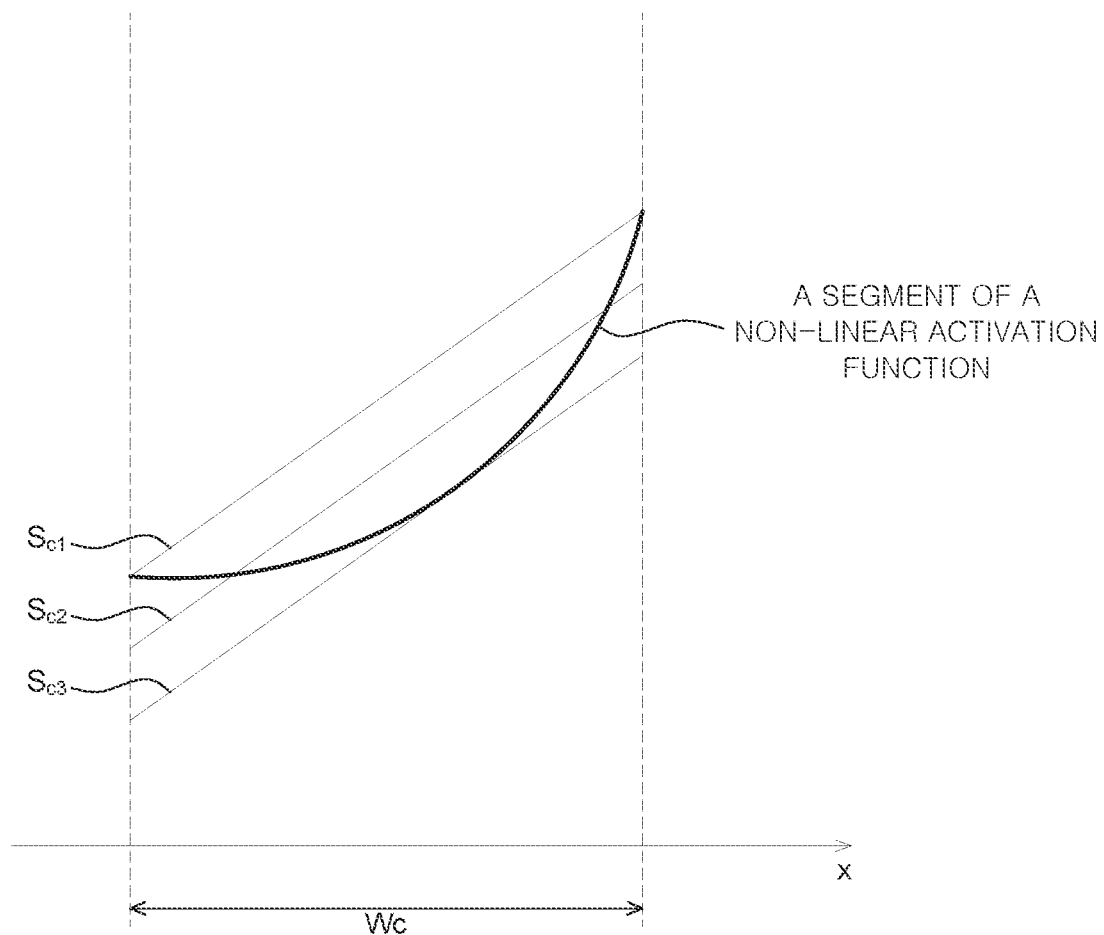
FIG. 8 is a graph illustrating an example of approximating a segment as a programmable segment using an error value of an activation function programming method according to an example of the present disclosure.

Referring to FIG. 8, a plurality of candidate segments Sc1, Sc2, and Sc3 for the segment S of the non-linear activation function are shown.

In the examples of the present disclosure, the term "candidate segment" means a function that can become a programmable segment expressed by a "programmable parameter" using an activation function programming method.

For example, if the programmable segment is expressed as a linear function, a programmable segment can be expressed as "(slope a)×(input value x)+(offset b)." Here, the programmable parameters may include slope a and offset b.

For example, if the programmable segment is expressed as a quadratic function, a programmable segment can be expressed as "(second-order coefficient a)×(input value $x^2$)+ (linear coefficient b)×(input value x)+(constant c)." Here, the programmable parameter may include a quadratic coefficient a, a linear coefficient b, and a constant c.

Hereinafter, a linear function will be described as an example. The candidate segment may be in the form of a linear function corresponding to a programmable segment segmented using segment data. A candidate segment for one segment may be determined as a linear function passing through the start and end points of the segment.

For example, the candidate segment for one segment may be a linear function whose offset is adjusted while having the same slope as a linear function passing through the start and end points of the segment.

For example, the candidate segment for one segment may be a linear function whose offset is adjusted while having a different slope from a linear function passing through the start and end points of the segment.

For example, a candidate segment for a segment may be determined as one of the tangents of the segment.

In FIG. 8, in order to briefly describe a process of determining a programmable segment from among a plurality of candidate segments, three candidate segments having a common slope passing through a start point and an end point of the segment S are shown. The first candidate segment Sc1 is a linear function passing through the start and end points of the segment S, the second candidate segment Sc2 and the third candidate segment Sc3 have the same slope as the first candidate segment Sc1 and are linear functions whose offsets are adjusted, and the third candidate segment Sc3 has an offset such that the candidate segment Sc3 is tangent to the segment S. The candidate segments shown in FIG. 8 are for briefly describing segments that may be approximated programmable segments, and the actual candidate segments may have their slopes and/or offsets adjusted in various ways to reduce an error value.

In various examples, at least one segment among the plurality of segments may be approximated as a programmable segment using the error value $\Delta y$. In this case, the PAF generator 3000 may approximate at least one segment among the plurality of segments as a programmable segment by determining the width of each of the plurality of segments as a uniform width, and using the error value $\Delta y$ based on the uniform width. However, the present disclosure is not limited thereto.

Figure 9A:
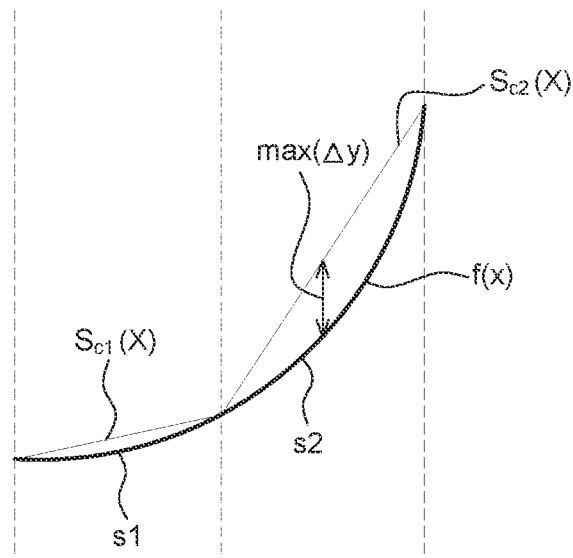
FIGS. 9A and 9B are graphs respectively illustrating an example of approximating a segment as a programmable segment using a maximum error value in an activation function programming method according to an example of the present disclosure.
Figure 9B:
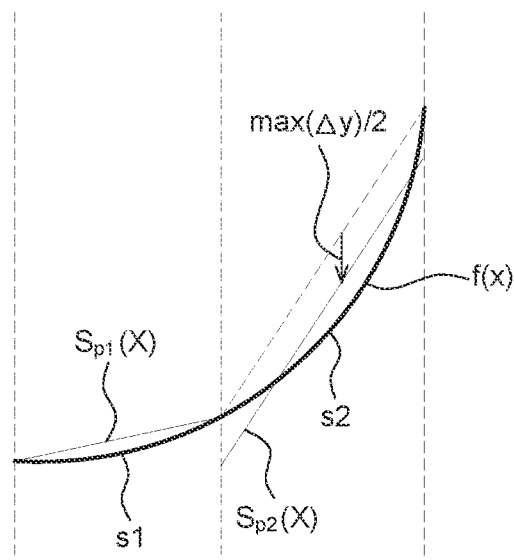

FIGS. 9A and 9B illustrate an example of approximating one segment to a programmable segment using a maximum error value max($\Delta y$), which is the largest value among error values $\Delta y$, in the activation function programming method according to an example of the present disclosure.

FIG. 9A shows segments s1 and s2 segmenting an activation function f(x), a first candidate segment $s_{c1}(x)$ corresponding to the first segment s1, and a second candidate segment $s_{c2}(x)$ corresponding to the second segment s2. In FIG. 9A for brief description as an example, the slope and offset may be determined such that each of the candidate segments $s_{c1}(x)$ and $s_{c2}(x)$ becomes a linear function passing through the starting point and the end point of each of the segments s1 and s2, respectively. Here, the programmable parameters of each programmable segment may include slope and offset. For example, an offset of the second candidate segment $s_{c2}(x)$ may be adjusted while having a slope such as a linear function passing the start and end points of the second segment s2, and the offset may be further adjusted while having a slope different from said linear function passing the start and end points of the second segment s2.

As in an example shown in FIG. 9A, the PAF generator 3000 may calculate an error value $\Delta y$ between the second segment s2 and the second candidate segment $s_{c2}(x)$, that is, the absolute value of "f(x)−$s_{c2}(x)$," expressed as |f(x)−$s_{c2}$(x)|, and a maximum error value max($\Delta y$), which is the largest value among the error values $\Delta y$, may also be calculated. In order to reduce the maximum error value of the second segment s2, as shown in FIG. 9B, the second candidate segment obtained by adjusting the candidate segment $s_{c2}(x)$ in the y-axis direction (i.e., adjusting the offset) by max($\Delta y$)/2, which is half of the maximum error value max($\Delta y$), may be determined as the second programmable segment $s_{p2}(x)$ obtained by approximating the second segment s2.

When the first programmable segment $s_{p1}(x)$ obtained by approximating the first segment s1 is shown as in FIG. 9B, a discontinuity may appear between the first programmable segment $s_{p1}(x)$ and the second programmable segment $s_{p2}(x)$.

In FIG. 9B, such discontinuity point may be intentionally induced in the process of approximating the second segment s2 of the activation function f(x) to a programmable segment based on the error value |f(x)−$s_{c2}(x)$|. That is, in the process of approximating a specific programmable segment to reduce the maximum error value within the specific programmable segment, a discontinuity may be generated at a point of boundary between adjacent programmable segments.

In more detail, as the approximation error value of the programmed activation function increases, the deterioration of inference accuracy of the NPU 1000 using the programmable activation function may increase. Conversely, as the approximation error value of the programmed activation function decreases, deterioration of the inference accuracy of the NPU 1000 using the programmable activation function may be reduced.

In various examples, at least one segment among the plurality of segments may be approximated as a programmable segment using an integral value $\int [s_c(x)-f(x)]dx$ of the error value.

In more detail, the first programmable segment $s_{p1}(x)$ and the second programmable segment $s_{p2}(x)$ may be programmed in different ways. That is, each programmable segment can be programmed by selecting a method such as a first-order function, a second-order function, a logarithmic function, and an exponential function, respectively. Thus, each programmable segment can be programmed with the same function or can be programmed with a different function.

Figure 10A:
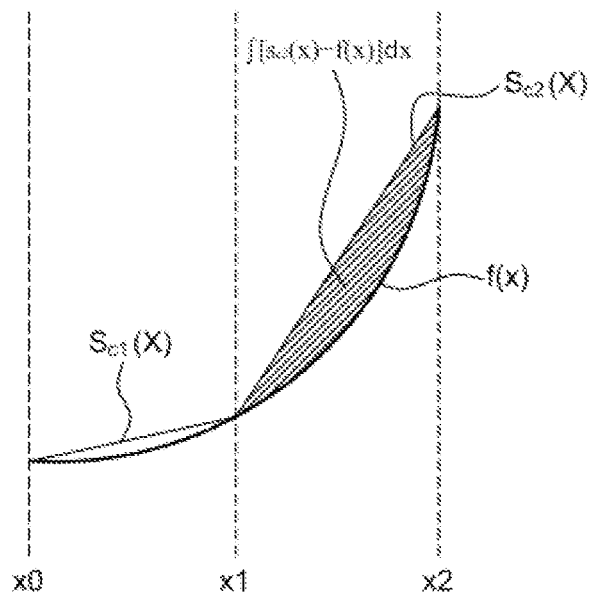
FIGS. 10A and 10B are graphs respectively illustrating an example of approximating one segment as a programmable segment using an integral value with respect to an error value in the activation function programming method according to an example of the present disclosure.
Figure 10B:
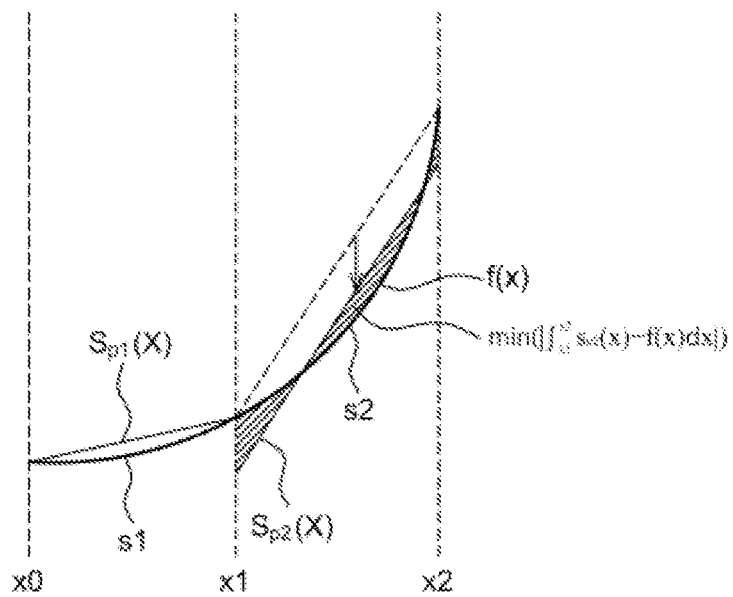

FIGS. 10A and 10B illustrate an example of approximating one segment to a programmable segment using an integral value $\int [s_c(x)-f(x)]dx$ with respect to an error value in the activation function programming method according to an example of the present disclosure.

FIG. 10A shows segments s1 and s2 segmenting the activation function f(x), a first candidate segment $s_{c1}(x)$ corresponding to the first segment s1, and a second candidate segment $s_{c2}(x)$ corresponding to the second segment s2. In FIG. 10A for brief description as an example, the slope and offset are determined so that each of the candidate segments $s_{c1}(x)$ and $s_{c2}(x)$ becomes a linear function passing through the starting and ending points of the respective segments s1 and s2. For example, the offset of the second candidate segment $s_{c2}(x)$ may be adjusted while having the same slope as a linear function passing the start and end points of the second segment s2, and the offset may be adjusted while having a slope different from the linear function passing the start and end points of the second segment s2.

As shown in FIG. 10A, the PAF generator 3000 may calculate an integral value $\int_{x1}^{x2} s_{c2}(x)-f(x)dx$ between the second segment s2 and the candidate segment $s_{c1}(x)$ as an error value, and search for the candidate segment with the smallest value among the integral values $\int_{x1}^{x2} s_{c2}(x)-f(x)dx$, that is, the absolute value of the integral value $\int_{x1}^{x2} s_{c2}(x)-f(x)dx$. In order to reduce the error value, as shown in FIG. 10B, a candidate segment having the smallest absolute value of the integral value $\int_{x1}^{x2} s_{c2}(x)-f(x)dx$, i.e., $\min(\int_{x1}^{x2} s_{c2}(x)-f(x)dx))$, may be determined as the second programmable segment $s_{p2}(x)$.

When the first programmable segment $s_{p1}(x)$ obtained by approximating the first segment s1 is illustrated as in FIG. 10B, a discontinuity may appear between the first programmable segment $s_{p1}(x)$ and the second programmable segment $s_{p2}(x)$. In FIG. 10B, such a discontinuity may occur in the process of approximating the second segment s2 of the activation function f(x) to the second programmable segment $s_{p2}(x)$ based on the error value $\int_{x1}^{x2} s_{c2}(x)-f(x)dx$. However, even if a discontinuity exists, if the approximation error value of each programmable segment is minimized, deterioration of inference accuracy of the NPU 1000 using the programmable activation function may be reduced.

In various examples, the step S220 may include a step of searching for a minimum error value between the programmable segment and the segment of the corresponding activation function.

For example, the step S220 may include a step of searching for at least one minimum error value between the at least one programmable segment and the corresponding segment of the at least one activation function.

For example, step S220 may include a step of determining a slope and an offset of the programmable segment based on the at least one searched minimum error value.

For example, step S220 may include a step of approximating the at least one segment to the programmable segment according to the determined slope and offset.

In various examples, step S220 may include a step of determining the programmable segment using machine-learning using a loss function.

Figure 11:
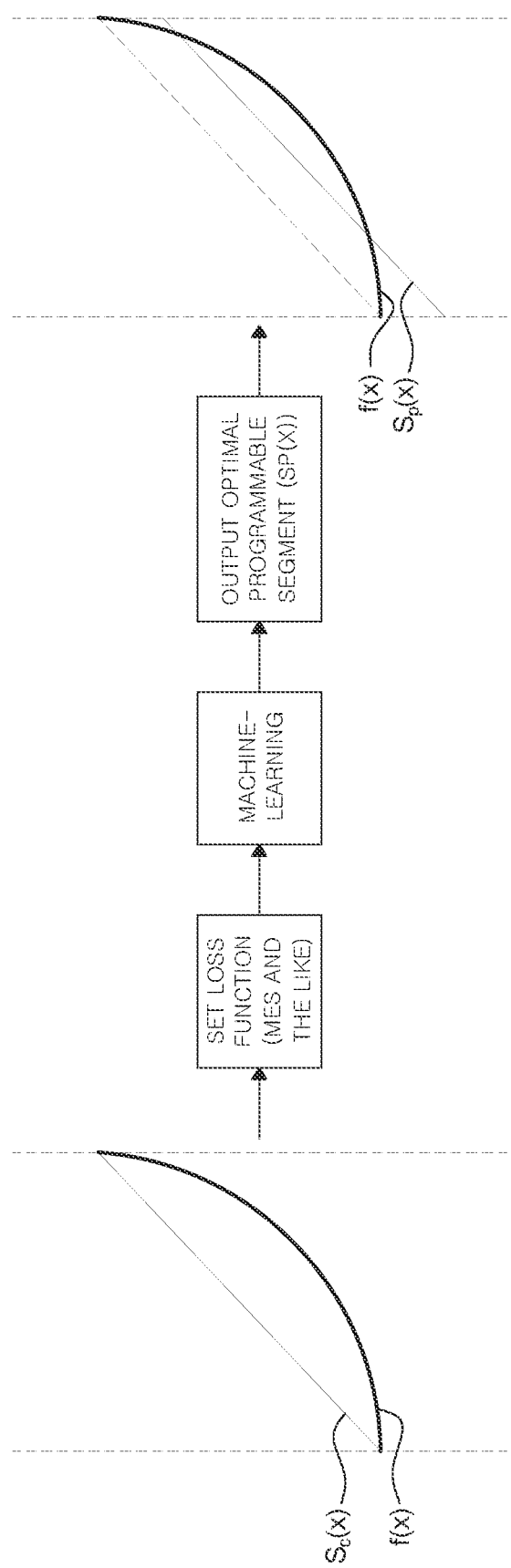
FIG. 11 is diagram including graphs for illustrating an example of approximating a segment as an optimal programmable segment using machine-learning for an activation function programming method according to an example of the present disclosure.

FIG. 11 illustrates an example of approximating a segment to an optimal programmable segment using machine-learning for an activation function programming method according to an example of the present disclosure.

Referring to FIG. 11, the PAF generator 3000 may set a candidate segment $s_c(x)$ for the activation function f(x) as an initial value of the loss function, and may determine a candidate segment having the smallest value of the loss function as an optimal programmable segment $s_{op}(x)$ through machine-learning. Accordingly, an optimized programmable parameter can be searched. As the loss function, mean squared error (MSE), root mean squared error (RMSE), and the like may be used, but is not limited thereto. In the present disclosure, for example, a candidate segment used as an initial value for the loss function may be a linear function approximated to correspond to segments segmented using segment data. However, examples according to the present disclosure are not limited to a linear function. That is, the loss function may be used after the activation function f(x) is segmented into a plurality of segments using segment data.

Accordingly, machine-learning using the loss function may be performed after characteristics of the activation function thereof, such as a plurality of characteristic sections including a (substantial) linear section and/or a non-linear section of the activation function, an approximation error, and the like, have been considered. Accordingly, the amount of computation of the optimized programmable parameter search can be reduced, and the deterioration of the inference accuracy of the NPU 1000 due to the use of the programmed activation function can be minimized. Also, according to the examples of the present disclosure, an effect of reducing the number of unnecessary segments may be provided. That is, according to examples of the present disclosure, it is also possible to minimize the number of segments.

In various examples, the step S210 may include a step of segmenting the activation function into a plurality of segments using an integral (accumulated value) of the second derivative of the activation function. Here, the accumulated value of the second derivative may be used as segment data.

For example, step S210 may include a step of calculating an accumulated value of the second derivative of the activation function.

For example, step S210 may include a step of segmenting the activation function into a plurality of segments based on a threshold value of the accumulated value of the second derivative.

Furthermore, the activation function programming method according to the present disclosure may include a step of firstly adjusting the threshold of the accumulated value of the second derivative when the number of the plurality of segments determined by segmenting the activation function into a plurality of segments using the accumulated value of the second derivative is greater than or less than a target number, and re-segmenting the activation function into another number of plurality of segments based on the adjusted threshold. Specifically, it can be adjusted such that (1) when the number of the determined plurality of segments is greater than the target number, the threshold is adjusted to increase, and (2) when the determined number of the plurality of segments is less than the target number, the threshold is adjusted to decrease.

In various examples, the PAF generator 3000 may segment the activation function into a plurality of segments based on a threshold value of the accumulated value of the second derivative. In this case, the PAF generator 3000 may segment all sections of the activation function based on the threshold value of the accumulated value of the second derivative or some sections of the activation function based on the threshold value of the accumulated value of the second derivative. In particular, the PAF generator 3000 may determine that some section of the activation function is a non-linear section rather than a (substantially) linear section, and may segment only a partial section that is a non-linear section based on a threshold value of the accumulated value of the second derivative value. The PAF generator 3000 may segment the remaining sections that are not non-linear sections by the activation function programming method described in various examples of the present disclosure.

Figure 12:
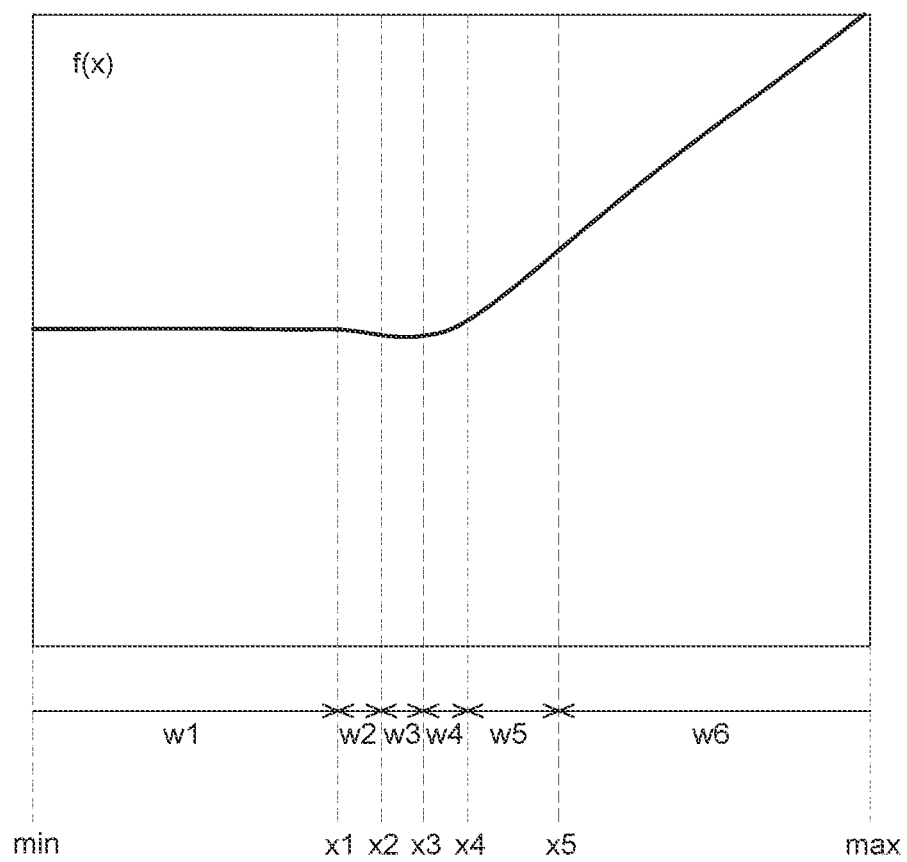
FIG. 12 is a graph illustrating an example of segmenting an activation function using a threshold value and an accumulated value of a second derivative of the activation function of the activation function programming method according to an example of the present disclosure.

FIG. 12 illustrates an example of segmenting an activation function using a threshold value and an accumulated value of a second derivative of the activation function of the activation function programming method according to an example of the present disclosure.

Referring to FIG. 12, the activation function f(x) may be segmented using the accumulated value of the second derivative of the activation function f(x), that is, $\int f''(x)dx$. The minimum value (min) of the activation function f(x) on the X-axis may be determined as the starting point, or the maximum value (max) of the X-axis may be determined as the starting point. However, the present disclosure is not limited thereto, and the starting point may be a special point.

The activation function f(x) is segmented for each segment in which the accumulated value of the second derivative of the activation function f(x) reaches the threshold value $E_{Th}$ from the starting point.

For example, the PAF generator 3000 may determine w1 when $\int_{min}^{x1} f''(x)dx=E_{th}$, may determine w2 when $\int_{x1}^{x2} f''(x)dx=E_{th}$, may determine w3 when $\int_{x2}^{x3} f''(x)dx=E_{th}$, may determine w4 when $\int_{x3}^{x4} f''(x)dx=E_{th}$, may determine w5 when $\int_{x4}^{x5} f''(x)dx=E_{th}$, and may determine w6 when $\int_{x5}^{x6} f''(x)dx=E_{th}$.

In addition, the programmable activation function used in the artificial neural network operation may be configured to process only input values within a limited range. For example, the minimum value (min) of the X-axis, which is an input value of the programmable activation function, may be minus six, and the maximum value (max) may be six. According to the above configuration, there is an effect that the data size of the programmed activation function can be reduced. However, the present disclosure is not limited thereto.

Referring to FIG. 12, since the accumulated value of the second derivative of the activation function is the rate of change of the slope of the activation function, it can be determined such that (1) in the activation function f(x), widths w2, w3, and w4 of the segments corresponding to sections having a relatively large gradient change rate are determined to be relatively narrow, and (2) in the activation function f(x), widths w1 and w6 of the segments including the portion that is a linear function with no rate of change of the slope are determined to be relatively wide.

Figure 13:
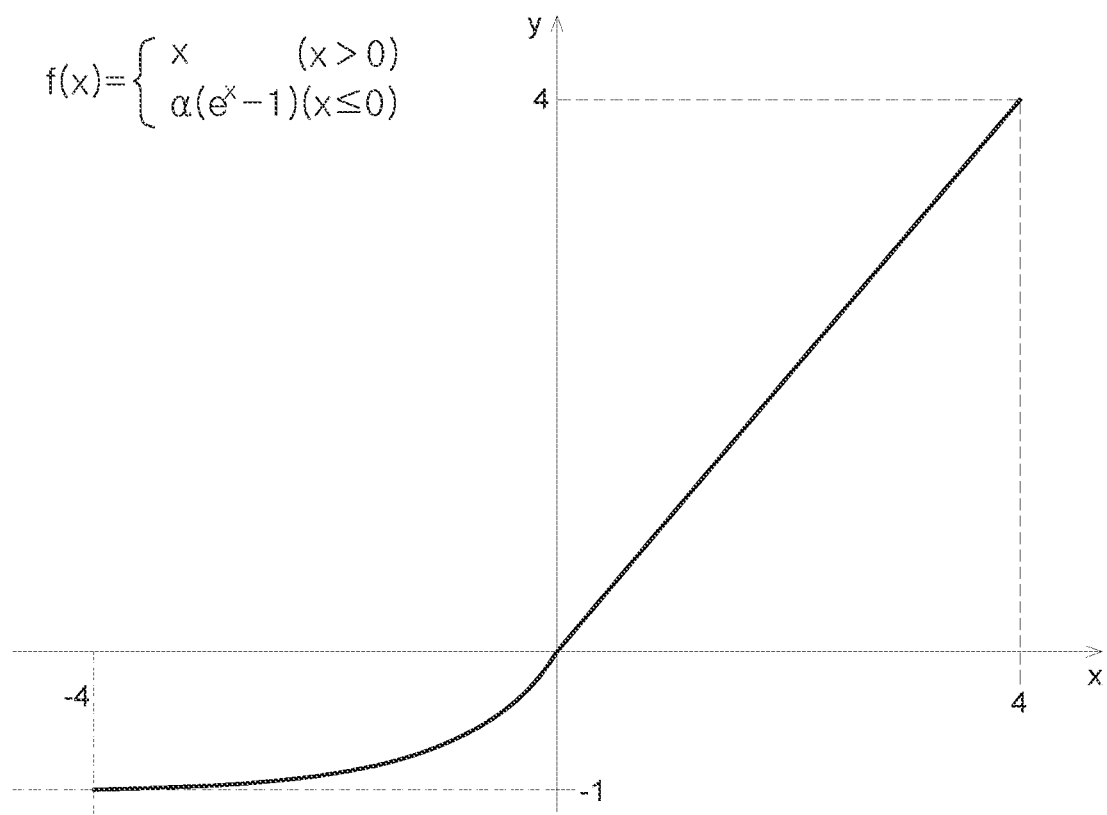
FIG. 13 is graph illustrating an exponential linear unit (ELU) activation function.
Figure 14:
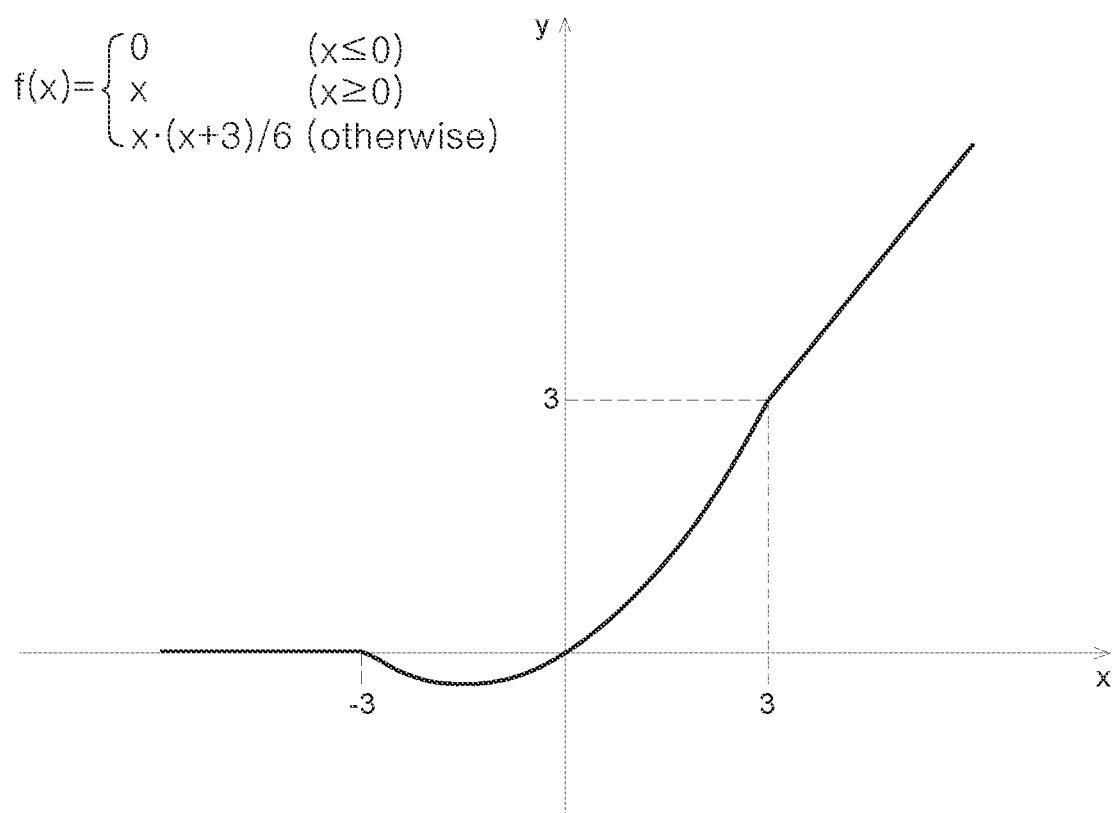
FIG. 14 is a graph illustrating a Hardswish activation function.

FIGS. 13 and 14 illustrate an ELU activation function and a Hardswish activation function, respectively.

The ELU activation function f(x) is x for x>0 and is $\alpha(e^x-1)$ for x≤0 (where α is a hyperparameter).

As shown in FIG. 13, the ELU activation function has a linear section when the x value is zero or more, and has a non-linear section when the x value is less than zero. That is, the ELU activation function has characteristics which are divided into a linear section and a non-linear section.

The Hardswish activation function f(x) is 0 for x≤−3, is x for x≥+3, and is x×(x+3)/6 for −3<x<+3.

As shown in FIG. 14, the Hardswish activation function has a linear section when the value of x is less than minus three or greater than three, and has a non-linear section otherwise. That is, the Hardswish activation function has characteristics which are divided into a linear section and a nonlinear section.

However, the present disclosure is not limited to the ELU activation function and the Hardswish activation function, and there are various activation functions having characteristics divided into a linear section and a non-linear section.

In particular, in the field of artificial neural networks, various customized activation functions in which various linear and non-linear functions are combined to improve the accuracy of artificial neural networks have been proposed. In this case, the activation function programming method according to examples of the present disclosure may be more effective.

In the activation function programming method according to the present disclosure, the PAF generator 3000 may distinguish a linear section and a non-linear section of the activation function, furthermore, a substantially linear section and a non-linear section, so that the activation function can be selectively segmented into a plurality of segments. Accordingly, the activation function programming method according to the present disclosure is efficient and minimizes approximation errors, particularly in programming for approximating activation functions having (substantially) linear and non-linear sections, and thus, it is possible to provide an improvement in the operation speed of an artificial neural network model processed in the NPU 1000, a minimization of deterioration in inference accuracy, and a reduction in power consumption of the NPU 1000.

In various examples, the activation function programming method according to the present disclosure may further include approximating at least one segment of the plurality of segments using a predetermined lookup table, a non-linear approximation equation, or the like.

In the activation function programming method according to the present disclosure, a plurality of segments is segmented using segment data, and since the plurality of segmented segments can be selectively approximated as a programmable segment, there may be a segment determined not to be approximated by the programmable activation function. If a predetermined and stored lookup table, non-linear approximation equation, and the like are available in hardware for such a segment, this segment may be approximated using a predetermined and stored lookup table, non-linear approximation equation, and the like.

In various examples, the activation function programming method according to the present disclosure may further include a step of determining not to approximate at least one of the plurality of segments as a programmable segment. For example, it may be decided not to approximate a segment with a very complex shape or a segment with low importance in an ANN model as a programmable segment. These segments may be processed in another predetermined manner or, if the number of such segments is large, may be combined and processed in another predetermined manner.

In various examples, the activation function programming method according to the present disclosure may handle the programming method for each segment in a separate manner.

The activation function programming method according to examples of the present disclosure may include selecting an activation function for artificial neural network (ANN) operation, and converting the activation function into a programmable activation function. Referring to FIG. 12, as an example, the programmed activation function may include a plurality of segments having a specific width, and the specific width may be determined based on a specific threshold, that is, for each segment in which the accumulated value of the second derivative of the selected activation function reaches the threshold.

An apparatus including a programmable activation function generator according to another embodiment of the present disclosure may be provided.

The programmable activation function generator may be configured to generate segment data for segmenting the activation function, segment the activation function into a plurality of segments using the generated segment data, and approximate at least one segment among the plurality of segments as a programmable segment.

At least one segment of the plurality of segments may have a different width than other segments.

The programmable activation function generator may be configured to determine the number and width of a plurality of segments based on segment data, and segment the activation function into a plurality of segments based on the determined number and width.

The segment data may include derivative data of the activation function.

The segment data may include information of hardware through which an activation function may be processed.

The programmable activation function generator may be configured to determine a substantially linear section and a non-linear section of the activation function based on the derivative data of the activation function, and segment the activation function into a plurality of segments according to the determined substantially linear section and non-linear section.

The programmable activation function generator may be configured to determine a slope and an offset for approximating the at least one segment to the programmable segment, and approximate the at least one segment to the programmable segment according to the determined slope and offset.

The apparatus may include a programmable activation function unit, wherein the programmable activation function unit may be configured to approximate the at least one segment using a predetermined non-linear approximation equation.

The examples illustrated in the specification and the drawings are merely provided to facilitate the description of the subject matter of the present disclosure and to provide specific examples to aid the understanding of the present disclosure and it is not intended to limit the scope of the present disclosure. It is apparent to those of ordinary skill in the art to which the present disclosure pertains in which other modifications based on the technical spirit of the present disclosure can be implemented in addition to the examples disclosed herein.

[National R&D Project Supporting This Invention]
[Task Identification Number] 1711152858
[Task Number] 2020-0-01297-003
[Name of Ministry] Ministry of Science and ICT
[Name of Project Management (Specialized) Institution] Institute of Information & Communications Technology Planning & Evaluation
[Research Project Title] Next-generation Intelligent Semiconductor Technology Development (Design) (R&D)
[Research Task Title] Technology Development of a Deep Learning Processor Advanced to Reuse Data for Ultra-low Power Edge
[Contribution Rate] 1/1
[Name of Organization Performing the Task] DeepX Co., Ltd.
[Research period] 2022.01.01-2022.12.31

What is claimed is:

1. A method for programming an activation function, a programmed activation function of the activation function generated by a programmable activation function (PAF) generator and configured to be provided to a PAF unit of a neural processing unit, the method comprising:
    providing the activation function and configuration information of the PAF unit to the PAF generator, the configuration information indicating numbers of comparators in the PAF unit;
    generating segment data for segmenting the activation function, the segment data including derivative data of the activation function;
    determining a substantially linear section or a non-linear section of the activation function based on the derivative data of the activation function;
    segmenting the activation function into a plurality of segments using the segment data; and
    approximating at least one segment of the plurality of segments as a programmable segment including a programmable parameter, the programmable segment corresponding to the at least one segment of the plurality of segments,
    wherein the programmable parameter of the programmable segment is programmed by the PAF generator, and
    wherein the PAF generator is implemented by firmware or software.

2. The method of claim 1, wherein the at least one segment of the plurality of segments that is approximated as the programmable segment includes at least one segment having a width different from another segment of the plurality of the segments.

3. The method of claim 1, wherein the segmenting includes:
    determining a number and a width of the plurality of segments based on the segment data.

4. The method of claim 1, wherein the approximating includes:
    approximating the at least one segment to a specific slope and a specific offset.

5. The method of claim 1, wherein the approximating includes:
    approximating the at least one segment of the plurality of segments using a predetermined non-linear approximation equation.

6. The method of claim 1, wherein the approximating includes:
    determining a slope and an offset for approximating the at least one segment as the programmable segment;
    determining an error value between the at least one segment and at least one candidate segment having the determined slope and offset; and determining the programmable segment among the at least one candidate segment based on the determined error value.

7. The method of claim 1, wherein the approximating includes:
   searching for at least one minimum error value between the programmable segment and a corresponding segment of the activation function; and
   determining a slope and an offset of the programmable segment based on the searched at least one minimum error value.

8. A method for programming an activation function, the method comprising:
   selecting the activation function for artificial neural network computation;
   converting the activation function into a programmed activation function, the programmed activation function comprising a plurality of segments each having a predetermined width, the predetermined width being determined based on a threshold value; and
   providing data of at least one programmed activation function to a programmable activation function (PAF) unit of a neural processing unit,
   wherein each of the at least one activation function is segmented using hardware information, the hardware information including configuration information of the PAF unit, the configuration information indicating numbers of comparators in the PAF unit.

9. The method of claim 8, wherein the at least one segment of the plurality of segments that is approximated as the programmable segment includes at least one segment having a width different from another segment of the plurality of the segments.

10. An apparatus comprising:
    a programmable activation function (PAF) unit including at least one comparator; and
    a processor including a central processing unit (CPU) as a computing device formed by hardware, the processor configured to:
      provide at least one activation function and hardware information of the PAF unit to a PAF generator, the hardware information including information on a number of the at least one comparator in the PAF unit; and
      operate the PAF generator to:
        generate segment data for segmenting the at least one activation function, the segment data including derivative data of the at least one activation function;
        determine a substantially linear section or a non-linear section of the at least one activation function based on the derivative data of the at least one activation function;
        segment the at least one activation function into a plurality of segments using the segment data; and
        approximate at least one segment of the plurality of segments as a programmable segment including a programmable parameter, the programmable segment corresponding to the at least one activation function,
    wherein the programmable segment is programmed by the PAF generator.

11. The apparatus of claim 10, wherein the at least one segment of the plurality of segments that is approximated as the programmable segment includes at least one segment having a width different from another segment of the plurality of the segments.

12. The apparatus of claim 10, wherein the processor is further configured to operate the PAF generator to:
    determine a number and a width of the plurality of segments based on the segment data; and
    segment the at least one activation function into the plurality of segments based on the determined number and width.

13. The apparatus of claim 10, wherein the at least one activation function is segmented into the plurality of segments based on the determined substantially linear section or the non-linear section.

14. The apparatus of claim 10, wherein the processor is further configured to operate the PAF generator to:
    determine a slope and an offset for approximating the at least one segment to the programmable segment; and
    approximate the at least one segment to the programmable segment based on the determined slope and offset.

15. The apparatus of claim 10, wherein the PAF unit is configured to approximate the at least one segment of the plurality of segments using a predetermined non-linear approximation equation.

16. The method of claim 8, further comprising:
    generating segment data for segmenting the activation function, the segment data including derivative data of the activation function;
    determining a substantially linear section or a non-linear section of the activation function based on the derivative data of the activation function;
    segmenting the activation function into a plurality of segments using the segment data; and
    approximating at least one segment of the plurality of segments as a programmable segment including a programmable parameter, the programmable segment corresponding to the at least one segment of the plurality of segments.

* * * * *